United States Patent [19]
Klemma

[11] Patent Number: 5,664,612
[45] Date of Patent: Sep. 9, 1997

[54] PORTABLE WOODWORKING ASSEMBLY

[76] Inventor: Asle Klemma, 424 Pleasant Dr., Roselle, Ill. 60193

[21] Appl. No.: 568,624

[22] Filed: Dec. 7, 1995

[51] Int. Cl.$^6$ ........................................... B25H 1/00
[52] U.S. Cl. .................. 144/286.1; 83/471.3; 83/574; 144/134.1
[58] Field of Search ................ 83/471.3, 57.1; 144/286.1, 134.1

[56] References Cited

U.S. PATENT DOCUMENTS

| | | | |
|---|---|---|---|
| 3,645,307 | 2/1972 | Stocker | 83/471.3 |
| 3,731,572 | 5/1973 | Crooks | 83/471.3 |
| 3,770,031 | 11/1973 | Olson | 144/136 R |
| 4,105,055 | 8/1978 | Brenta | 144/286.1 |
| 4,133,237 | 1/1979 | Lewin | 83/574 |
| 4,197,775 | 4/1980 | Handler et al. | 83/471.3 |
| 4,281,694 | 8/1981 | Gorman | 144/134 D |
| 4,995,288 | 2/1991 | Della Polla | 83/574 |
| 5,165,317 | 11/1992 | Findlay | 83/574 |
| 5,273,090 | 12/1993 | Klemma | 83/574 |
| 5,518,053 | 5/1996 | Robison | 83/574 |

*Primary Examiner*—W. Donald Bray
*Attorney, Agent, or Firm*—Richard R. Mybeck; Peter B. Scull

[57] ABSTRACT

A portable woodworking assembly for use in supporting wooden workpieces and portable power tools for cutting, shaping and forming the workpieces with the portable power tools. This assembly includes a frame sub-assembly; one or more tool support structures including clamping structures for fixedly attaching the tool support structure to the frame sub-assembly and alternative slide structures which engage the frame sub-assembly for movably guiding a portable power tool relative thereto; and a workboard sub-assembly operatively associated with the frame sub-assembly to support a workpiece relative thereto and selectively position said workpiece relative to the portable power tool so that the power tool may engage the workpiece in the desired fashion.

19 Claims, 3 Drawing Sheets

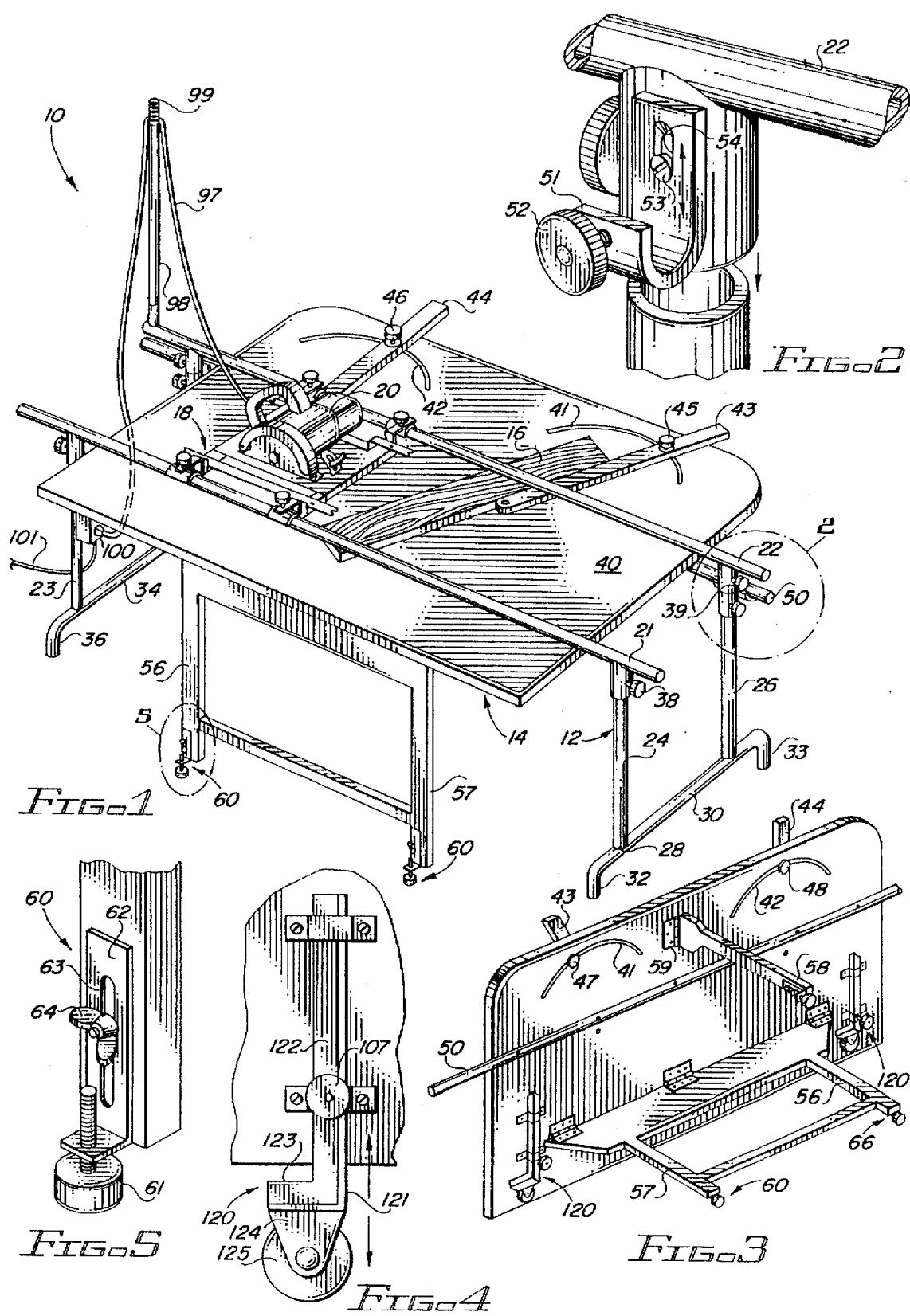

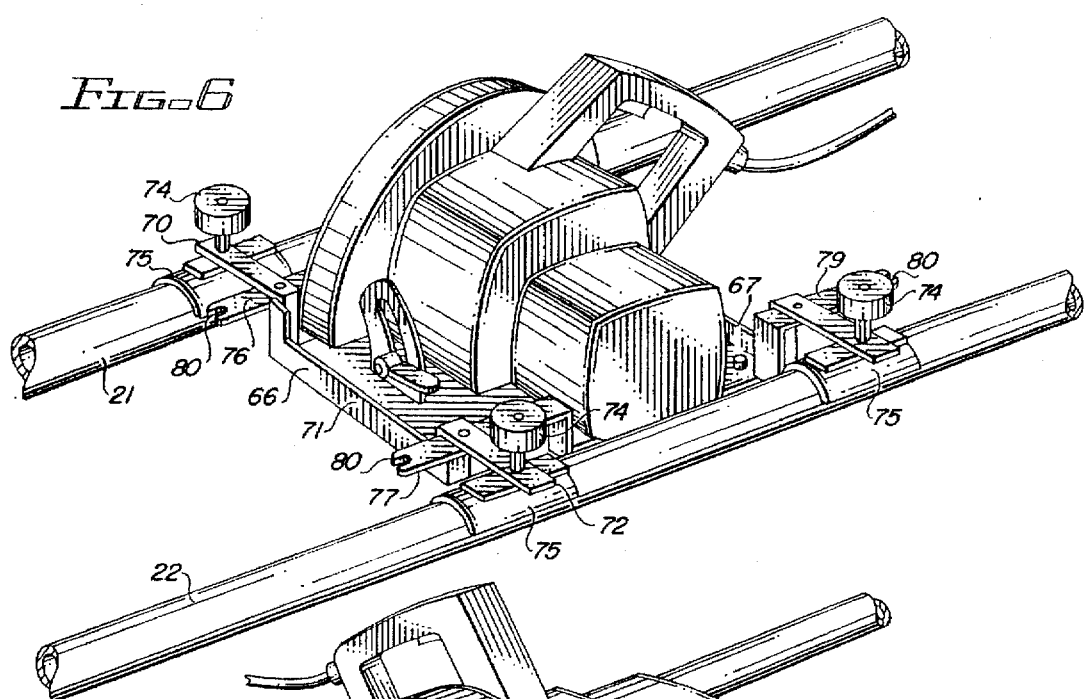
FIG. 6
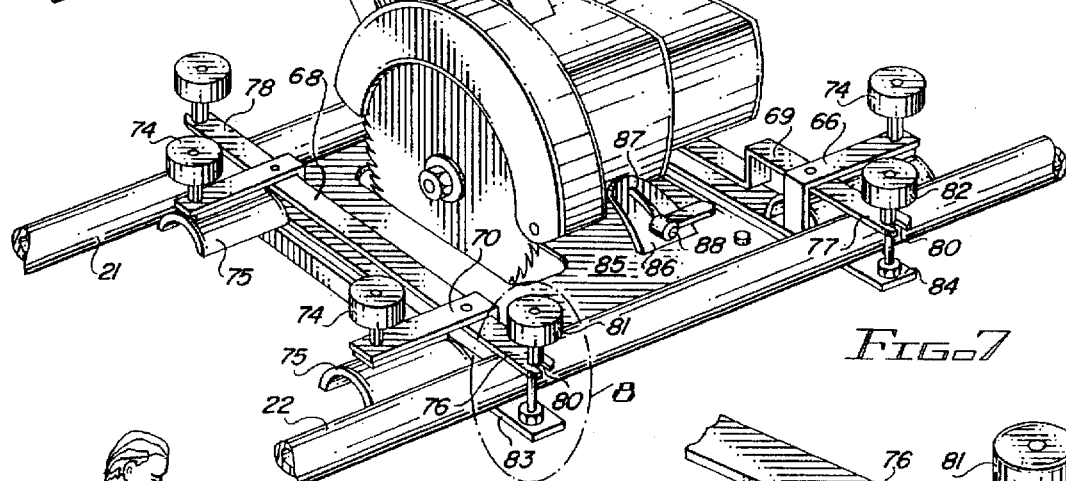
FIG. 7
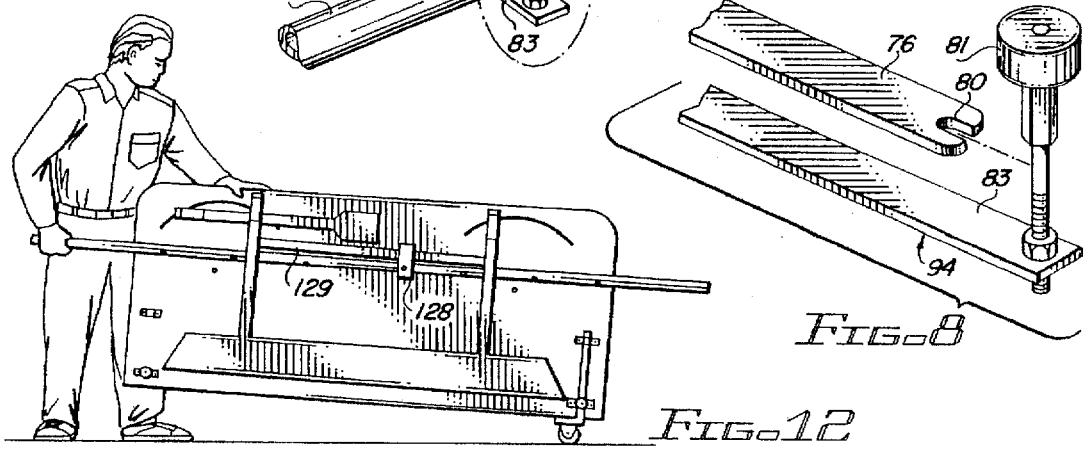
FIG. 8
FIG. 12

PORTABLE WOODWORKING ASSEMBLY

The present invention relates generally to a portable woodworking assembly and more particularly to a device for cutting, shaping and/or forming wood pieces and allowing for either stationarily securing or movably guiding a portable tool in a manner which may be simply practiced at serial job sites or in the shop.

BACKGROUND OF THE INVENTION

The cutting, shaping and forming of wooden pieces by power tools has heretofore been limited in numerous ways by the stationary and portable woodworking tools that have been available. These limitations have posed several problems. First, prior art stationary tools such as table saws could not be simply moved to serial worksites and each workpiece had to be moved to and over the stationary table on which the cutting tool was disposed. This made for strenuous human efforts in moving the stationary table/tool and/or in moving the workpiece especially when the workpiece was large or heavy or extremely long. Long pieces of wood were particularly vexatious because they tended to bounce while being cut. If the workpiece moved in this way while being cut, the cut had to be redone or more often than not the workpiece was ruined.

Portable woodworking tools provided a solution to some of these difficulties in that bulky stationary tools would not then have to be moved from site to site, and it would then be possible to have large workpieces remain stationary while a portable tool was moved thereover. However, portable tools also have had problems. For example, though a portable circular saw is movable over a workpiece, thus removing the problem of moving large, bulky workpieces to and over a stationary table saw, a portable circular saw nevertheless has a distinct disadvantage in that it is less accurate. Uneven cuts have often resulted due to human error in the guiding of the tool or because the saw would follow or move offline due to impurities such as knots in the workpiece.

Attempts have been made to cure some of these problems with stationary and portable tools. For example, Findlay, U.S. Pat. No. 5,165,317, introduced a portable table having support attachments for movable power tools as well as for fastening stationary tools to the table. Findlay uses an elaborate parallelogram support frame for securing either sort of power tool to Findlay's table. Further, Della Polla, U.S. Pat. No. 4,995,288 and Lewin, U.S. Pat. No. 4,133,237, described non-portable power tool support alternatives which also provided parallelly oriented power tool guide supports or rails. Recently, Klemma, U.S. Pat. No. 5,273,090, disclosed an assembly for woodworking which employs parallel guide rails to support a movable power tool.

Nonetheless, a need still exists for a simpler, portable woodworking assembly. And, the present invention is directed toward just such an assembly which obviates the prior art problems in a unique and cost efficient way and permits high quality cutting, forming and shaping of workpieces, either in the workshop or on one or more serial building sites.

BRIEF SUMMARY OF THE INVENTION

The present invention particularly involves a portable assembly for cutting wooden-workpieces wherein the assembly may be utilized either in a workshop or on one or more serial job sites. As will appear, the assembly of the present invention permits the use of less costly portable power tools to obtain physical results, some of which heretofore having been achievable only from the use of more expensive stationary tools such as table saws and the like.

The present invention has a frame sub-assembly for supporting a portable, hand-operated power tool, and further has a workboard sub-assembly for supporting workpieces to be engaged by the power tool. The frame sub-assembly is fashioned such that it allows for precisely controlling the movement of the power tool relative to the workpiece. It thus includes parallel, level guide rails that support a movable tool support structure or jig, to which a selected power tool is affixed.

The workboard sub-assembly is fashioned to support a workpiece below both the guide rails and the power tool. It comprises a workboard, securing means for attaching the workboard sub-assembly to the frame sub-assembly and a plurality of folding legs for holding the workboard in upright horizontal position so that it may thereby support the workpiece to be cut, formed and/or shaped. The workboard sub-assembly preferably also comprises at least one semi-circular channel or slot formed therein which, in coaction with a pivotable fence, provides an adjustable work stop against which the workpiece may rest for mitering cuts or for other purposes to be described in detail below. A table extension is also provided to grant still further versatility to the sizes and shapes of workpieces usable herewith.

Preferably, there are a plurality of interchangeable tool support structures or jigs, each of which being adapted to traverse along the guide rails in a fixed, straight-line manner as well as being securely and stationarily attachable to the frame sub-assembly. The interchangeable tool support structures include one or more structures for holding, for example, a circular ripsaw, or a crosscut saw and/or other tool support structures for a planer or a router, or the like. Thus, each of these support structures allows for both sliding the selected tool in a straight line over the workpiece so that the selected tool can make an accurate cut in or through the workpiece, as well as for securely attaching the tool to the frame sub-assembly so that selected workpieces can be moved into and through the now stationary power tool. This provides for greater versatility and choice of functionality depending on the workpiece to be cut. Also, in a fashion similar to that described in my U.S. Pat. No. 5,273,090, a plurality of beveled or angled cuts may be made with special slotted adjustment means on the tools or the tool support structures which thus hold the power tool at a desired angle relative to the workpiece.

Further, to enhance portability, a removable wheel sub-assembly is also provided. The wheel sub-assembly is attachable to the workboard sub-assembly to ease the maneuverability of the workboard sub-assembly from one work site to another.

Accordingly, a primary object of the present invention is to provide a novel and unique woodworking assembly that enables the operator thereof to avoid being restricted to working on stationary equipment located solely in a permanent workshop.

Another object of the present invention is to provide a new and improved woodworking assembly which accommodates and allows for guiding small portable power tools relative to a selected workpiece in a manner which substantially eliminates the difficulties associated with handling a plurality of variously sized and shaped workpieces while also providing a full gamut of cuts, angles and shapes which may be cut in or through the workpiece.

These and still further objects as shall hereinafter appear are readily fulfilled by the present invention in a remarkably unexpected manner as will be readily discerned from the following detailed description of an exemplary embodiment thereof especially when read in conjunction with the accompanying drawings in which like parts bear like numerals throughout the several views.

BRIEF DESCRIPTION OF THE DRAWINGS

In the drawings:

FIG. 1 is an isometric view of a woodworking assembly embodying the present invention;

FIG. 2 is a fragmented, exploded isometric view of the frame sub-assembly of FIG. 1 taken from the circled area 2 of FIG. 1;

FIG. 3 is a bottom isometric view of a workboard sub-assembly embodying the present invention;

FIG. 4 is a fragmented, elevational view of the workboard sub-assembly of FIG. 3 showing a wheel sub-assembly in operative association therewith;

FIG. 5 is a fragmented, isometric view of a foot sub-assembly of the workboard sub-assembly of FIG. 1 taken from circled area 5 thereof;

FIG. 6 is an isometric view of a power tool and tool support structure in operative association with a fragmented portion of the frame sub-assembly of FIG. 1;

FIG. 7 is an isometric view of the power tool and tool support structure of FIG. 6 in an alternative operative position relative to the fragmented portion of the frame sub-assembly of FIG. 6;

FIG. 8 is a fragmented, isometric and exploded view of the tool support structure attachment means shown in circled area 8 of FIG. 7;

FIG. 12 is an elevational view of a workboard sub-assembly of the present invention in a transportable position.

DESCRIPTION OF THE PREFERRED EMBODIMENT

Figure 9A:
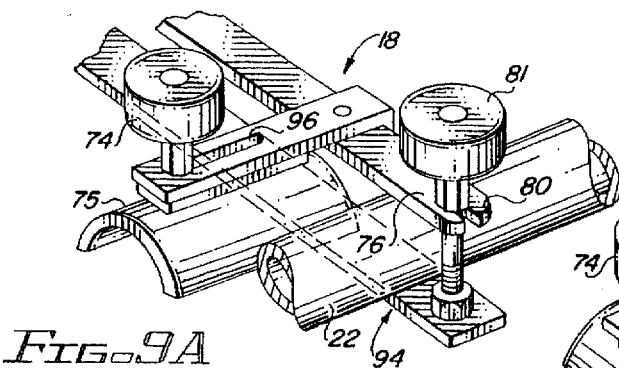
FIG. 9A is a fragmented, isometric view of a portion of the tool support structure in operative association with a fragmented portion of the frame sub-assembly as shown in FIG. 7.

The present invention relates generally to means and methods for cutting, forming and shaping selected wooden workpieces. More particularly, the present invention provides a novel and unique woodworking assembly identified in the accompanying drawings by the general reference 10.

As shown in FIG. 1, woodworking assembly 10 comprises a frame sub-assembly 12, a workboard sub-assembly 14 operatively associated with frame sub-assembly 12. Workboard sub-assembly 14 is shown supporting a workpiece 16 which is disposed in an operative position relative to a tool support structure 18 which is mounted upon frame sub-assembly 12. Tool support structure 18 is slidably moveable longitudinally on frame sub-assembly 12 as shown in FIG. 1 and as will be described further below, is also adapted to be alternatively securely attached thereto. Support structure 18 provides support for a suitable woodworking power tool 20 such as the portable circular saw shown so that power tool 20 may operatively engage workpiece 16 to accomplish the desired cutting, shaping or forming thereof. As will further appear, various alternative woodworking power tools 20 can be mounted on this or alternative tool support structures 18 so that they may be moveable along or fixable to frame sub-assembly 12 to perform any number of preselected tasks on a workpiece 16 The entire operation can be accomplished at any site where appropriate power for the tool is available from, for example, conventional power lines, portable battery packs, generators, and the like.

As shown primarily in FIG. 1, frame sub-assembly 12 comprises a first rail member 21 and a second rail member 22 disposed in spaced, parallel, coplanar relationship to each other. Each rail is seated upon and detachably secured to the upper end of a first and second vertical pipe support or leg member such as, for example, leg members 23, 24 which support rail 21. Leg members 23, 24 are disposed in spaced, generally parallel relationship to each other intermediate the ends of rail 21 and are also perpendicular thereto. Leg members 25, 26 are similarly positioned relative to rail member 22. The lower end 28 of each leg, for example leg 24, is attached to a base member such as base member 30. Base member 30 is supported by and extends transversely between foot members 32, 33. In like fashion, leg member 26 is also attached to base member 30. A second base member 34 is similarly attached and supports leg members 23, 25 which likewise support the distal ends of rails 21, 22. Base member 34 is in turn attached to and supported by foot members 36, 37. In this fashion then, rails 21 and 22 are securable in spaced, parallel, coplanar relationship to each other.

In one practice of the present invention as shown in FIGS. 1 and 2, the disassemblable components of frame sub-assembly 12 are shown. Vertical leg members 23, 24, and 25, 26 are preferably permanently attached at their corresponding points to base members 30, 34. Rails 21, 22 are then detachably mounted on and secured to the upper ends of legs 23, 24, 25 and 26. Locking turn-bolts such as 38, 39 may then be used to secure these connections. Thus assembled, rail members 21, 22 are disposed as described above, in spaced, parallel, substantially horizontal relationship to each other, and are perpendicular to legs 23, 24, 25 and 26, and further are disposed in spaced, orthogonal relationship to base members 30, 34.

As shown in FIGS. 1 and 3, workboard sub-assembly 14 generally comprises a substantially rectangular body member 40 having one or more semicircular slots 41, 42 defined therein for adjusting fence angles so that numerous angled cuts can be made for mitering or other purposes. Pivotable fences 43, 44 are operatively and detachably disposed on workboard body member 40 and are associated with slots 41, 42 to define a plurality of fence angles relative to rail members 21, 22. Locking turn-bolts 45, 46 are operatively attached to fences 43, 44 and when fences 43, 44 are attached to body member 40, the body portions of turn-bolts 45, 46 extend down into and through respective slots 41, 42 such that they can be used to lock each fence in a desired position to create the desired work angles. Locking discs 47, 48, as shown in FIG. 3, receive the threaded lower ends of locking turn-bolts 45, 46 to coact therewith and lock the respective fence in the desired position. Turn-bolts 45, 46, when tightened, cause discs 47, 48 to forcibly bear against the underside of body member 40 and thus create a sufficient amount of friction to disallow movement of either fence relative to body member 40.

Body member 40 has a support bar 50 attached to the underside thereof as shown in FIG. 3. Bar 50 fits into U-shaped supports such as support 51 on frame sub-assembly 12 as is shown in FIG. 2. Bar 50 can be secured in these U-shaped supports by known methods including, for example, turn-bolts 52 one of which is also shown in FIG. 2. An adjustable bolt/slot connection involving bolt 53, and slot 54 provides a certain amount of-height-adjustability for U-shaped support 51 as will be described further below.

Body member 40 is also supported in horizontal position by a plurality of folding legs, such as folding legs 56, 57 as shown in FIG. 1 and folding leg 58 as shown in FIG. 3. Legs 56, 57 and 58 are hingedly attached to the underside of body member 40 through known means such as common double leaf hinges 59.

As described, workboard sub-assembly 14 is thus mounted on frame sub-assembly 12 with bar 50 seated in U-shaped support members such as member 58 and is further supported by legs 56, 57 and 58 so that the upper surface thereof is fixed a preselected distance underneath and preferably not in contact with horizontal guide rails 21, 22. This distance between body member 40 and rails 21, 22 is adjustable. Foot assemblies 60 which are attached to the lower ends of each of legs 56, 57 and 58 provide height adjustment in a simple fashion as shown in FIG. 5. Specifically, a threaded foot portion 61 is adjustably screwed into a slidable frame portion 62. Frame portion 62 has a slot 63 in which a wingnut bolt combination 64 is secured to adjustably fasten frame portion 62 to the workboard leg. When wingnut bolt combination 64 is loosened, frame portion 62 may be moved vertically to a desired position and then secured in this position by wingnut bolt combination 64. Each of the U-shaped support members likewise has a height adjustment means which corresponds to the adjustability of foot assemblies 60. An adjustable bolt/slot connection 53, 54 which connects each of the U-shaped support members to frame sub-assembly 12 provides for vertical adjustability of, for example, U-shaped support member 51 as shown in FIG. 2 and hence, the vertical disposition of support bar 50 of workboard sub-assembly 14. In a fashion similar to that described for the slot/bolt interaction of foot assemblies 60 above, bolt 53 is disposed in and engages vertically adjustable slot 54 to secure support 51 at a desired height.

Referring now to FIGS. 1, 6, and 7, tool support structure or jig 18 is generally rectangular in shape and comprises known means for securing a suitable power tool 20 such as a circular crosscut or rip saw thereto. More particularly and as is shown best in FIGS. 6 and 7, a structure 18 comprises at least a first and a second cross member 66, 67, each of which is secured to a first and a second longitudinal side bar 68, 69. Each cross member, for instance cross member 66, is a unitary member extending from a first upper end 70 down through and including a lower main portion 71 and again up to a second upper end 72. Turn-bolts 74 are used to attach curved contact members 75 to cross members 66, 67. The threaded parts of turn-bolts 74 extend through, for example, each of the upper ends 70, 72 of cross member 66 into engagement with curved contact members 75 so that when turn-bolts 74 are tightened, they fix curved contact members 75 in place relative to the cross member as shown in FIG. 6 so that structure 18 can be placed on and is thus slidable along guide rails 21, 22.

Longitudinal side bars 68, 69 each have portions which extend beyond the connection points of side bars 68, 69 to cross members 66, 67. These portions are referred to here as forward extensions 76, 77 and rearward extensions 78, 79. Each extension has a circular notch 80 formed therein to receive special turn-bolts such as turn-bolts 81 and 82 as shown in FIG. 7 and 8. More details about turn-bolts 81, 82 and the detachable side bars 83, 84 to which turn-bolts 81, 82 are attached will be described below.

Power tool 20 is bolted or otherwise attached to tool support structure 18 preferably at at least four rectangularly-related points (not shown), two of which where the base plate 85 of power tool 20 meets front cross member 66 and the other two of which where baseplate 85 meets rear cross member 67. As shown generally in FIGS. 6 and 7, a separate bolt connection 86 having a curved slot 87 integrally attached to base plate 85 allows for tilting power tool 20 in generally known fashion. Connection 86 is one part of the connection of power tool 20 to baseplate 85. Wingnut 88 is loosened and adjusted in slot 87 to obtain the desired tilt angle. Wingnut 88 is then tightened and power tool 20 is ready for use to create bevels and like non-orthogonal woodworking forms when desired.

An alternative position for power tool 20, as shown in FIG. 7, is available when support structure 18 with power tool 20 attached thereto is removed from its FIG. 6 sliding position on rails 21, 22, rotated 90 degrees and then securely and immovably attached to guide rails 21, 22. In this alternative position, the extensions 76, 77, 78, 79 of longitudinal side rails 68, 69 are then also attached to separate, adjustable side clamps 94, 95 (which comprise detachable side bars 83, 84 and turn-bolts 81, 82) so that tool support structure 18 can be immovably attached to guide rails 21, 22. In use, when power tool 20 is immovably seated upon guide rails 21, 22 as shown, a workpiece 16 must be moved into the cutting member of power tool 20. As shown in more detail in FIG. 8, clamps 94, 95 are positioned such that bar 83 is underneath the guide rails of frame sub-assembly 12 and then turn-bolt 81 is positioned in a corresponding notch 80. Turn-bolt 81 may then be tightened. All of the other side clamp turn-bolts are then also positioned in their corresponding notches 80 and tightened. Power tool 20 is thus fixed in place on rails 21, 22.

Figure 9B:
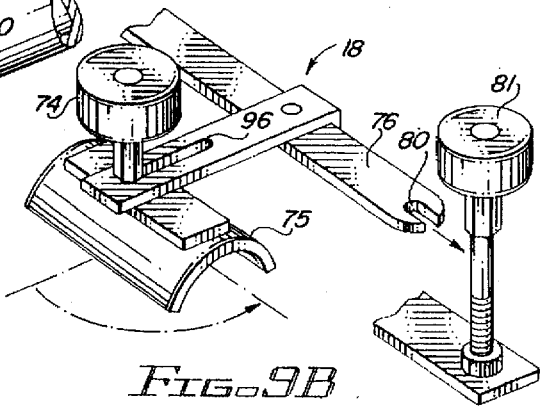
FIG. 9B is a fragmented, isometric and exploded view of the tool support structure portion of FIG. 9A shown being altered to an alternative operative position.
Figure 9C:
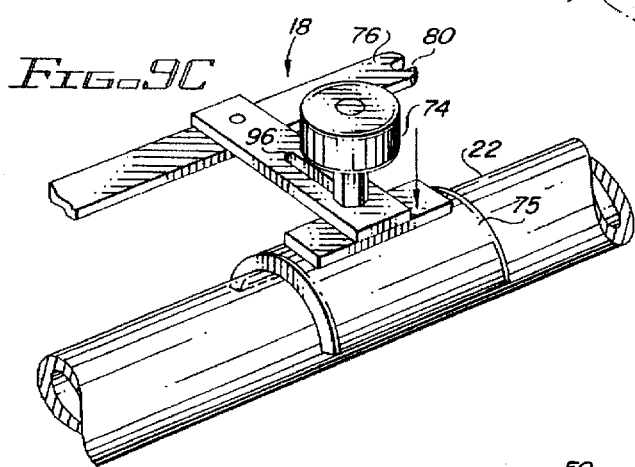
FIG. 9C is a fragmented, isometric view of the tool support structure portion of FIG. 9B rotated approximately 90 degrees and shown in an alternative operative association with another fragmented portion of a frame sub-assembly of the present invention.

FIGS. 9A-9C show further details of the process of converting the tool from one operative position to another. Specifically; FIGS. 9A-9C track the process of going from a fixed in place power tool 20 such as is shown in FIG. 7 to a slidable power tool 20 such as that shown in FIG. 6. Of course, these steps are merely reversed to go from slidable to fixed in place.

In particular, FIG. 9A shows a portion of tool support structure 18 connected to rail 22 with a side clamp 94. Moving to FIG. 9B, FIG. 9B, turn-bolt 80 is loosened and then removed from notch 80 of extension 76. Further, turn-bolt 74 is loosened and contact member 75 is rotated approximately ninety degrees (90°) as shown, and then turn-bolt 74 is re-tightened to fix contact member 75 in this position. Then, in moving to FIG. 9C, the entire tool support structure is lifted and rotated ninety degrees (90°) and placed on the guide rails so that contact member 75 rests on rail 22 as shown. An optional slot 96 in extension 76 may be provided to grant further versatility in making the movements depicted in FIGS. 9A-9C.

In the making of a woodworking assembly 10, frame sub-assembly 12 may be created with any suitable sturdy structural materials such as aluminum tubing, pipe made from other metals, or the like and the external surfaces thereof can be either flat or curved depending upon personal choice and/or the materials to be used. Thus, rails 21, 22 and/or all the components of sub-assembly 12 may be tubular pipe-shaped forms as shown here, or extruded or rectangular metal or wooden stock. The attachment of these components will thus depend upon the material used and the shape. The attachment of leg members 23, 24, 25, 26 to bases 30, 34 and rails 21, 22 will be facilitated if these members complement the contour of the corresponding members to be mounted thereto. Further, if wooden stock is used, the corresponding frame members may be screwed, nailed, bolted or otherwise affixed to each other in known fashion. For metal members, these also may be attached in known fashion using bolts and the like; however, these may also be welded or similarly attached. Indeed, in the preferred embodiment, the connections of legs 23–26 are welded to bases 30, 34 whereas simply detachable turn-bolt connections are used for the attachments of rails 21, 22 to legs 23–26. In this way, frame sub-assembly 12 may be easily disassembled and then transported to another location to be reassembled.

Workboard sub-assembly 14 is preferably made of wood. Thus, workboard 40 would be wooden as would folding legs 56, 57, 58 and fences 43, 44. Then, the respective attachments would preferably include metallic nuts, bolts and/or wood screws. Metallic double-leaf hinges 59 would thus be screwed into their respective wooden workboard and leg members. Bar 50 is preferably bolted to body member 40. Turn-bolts 45, 46, as described above, are used in slots 41, 42 to pivotally attach fences 43, 44 to body 40. Preferably, metallic dowels (not shown) can be affixed partially in and protruding slightly out from the desired pivot points in fences 43, 44 and then the protrusions of these dowels removably inserted in corresponding holes (not shown) formed on the top surface of body member 40.

Tool support structure 18 is preferably made of metal parts, though equivalently durable materials may be used. These, then, may be welded or bolted or otherwise firmly fastened together at all points. Thus, manufacture of support structure 18 may take place in ordinary known fashion including bolting, welding or otherwise manufacturing it into the desired shape as described. Power tool 20 is any of a number of commercially available devices which is then, as briefly mentioned above, bolted or otherwise attached to cross members 66, 67 of tool support structure 18.

Assembly of the various parts takes place as follows. First, frame sub-assembly 12 is erected. Base member 30 and 34 are positioned in a suitable location at a proper distance from each other. Then, each guide rail 21, 22 is fastened to the respective upstanding leg members 23–26 whereupon frame sub-assembly 12 takes the form shown in FIG. 1. Then, workboard sub-assembly 14 is moved into place and bar 50 is set into U-shaped supports 51, 52. Preferably, legs 56–58 will remain folded underneath workboard body member 40 until bar 50 is in place. Then, workboard body member 40 is rotated to be roughly parallel to the ground and then legs 56–58 are unfolded to support body member 40 in this position as shown in FIG. 1. Height adjustment of body member 40 can take place during this process by moving the U-shaped support members and foot assemblies as described above.

Next, a power tool 20 such as a circular saw which has been preattached to support structure 18, as described above, is slidably or fixedly mounted atop guide rails 21, 22 as shown in FIGS. 1, 6 or 7. Power cord 97 of power tool 20 is then movably or otherwise attached to an optional, removable stand 98 preferably attached to one end of either rail 21 or 22. As shown, a spring 99 atop stand 98 can be used to hold power cord 97 up out of the way. Power cord 97 is then plugged into an appropriate power supply. A power box 100 is shown in FIG. 1 mounted between legs 23, 25 and can be used as an intermediate electrical connection. Thus, power cord 97 may be plugged into power box 100 which then has an extension 101 running to an external power supply (not shown).

Referring again to FIGS. 1, 6 and 7, the utilization of the woodworking assembly of the present invention to produce different cuts including straight and angled cuts with either a movable saw or a fixed saw and will now be described. Note, hereafter power tool 20 will be referred to as saw 20 for illustrative purposes only. Other power tools are intended to be usable with woodworking assembly 10 and can be used in manners which should be obvious in view of the description herein.

Various methods for making orthogonal or straight cuts will first be described. First, with pivotable fences 43, 44 removed from body member 40, a long or otherwise large, preselected workpiece 16, over which saw 20 will be slidably moved, is placed on the upper surface of body member 40 and may be clamped in place by extraneous clamping means (not shown) or otherwise held in a stationary cutting position. This first situation is meant to include those workpieces 16 which extend less than the entire length of guide rails 21, 22 or if longer, also those workpieces 16 which are thin enough to extend between respective leg pairs 23, 25 and 24, 26. Then, the saw, as slidably mounted on guide rails 21, 22, is manually operated and slidably moved along rails 21, 22 and thus run over and through workpiece 16 to create the desired straight, even cut along the length of guide rails 21, 22.

Another method for making straight cuts involves the use of either fence 43, 44 coacting with, as shown in FIG. 7, a fixed, immovable saw stationarily attached to guide rails 21, 22 by clamps 94, 95. Tool support structure 18 with a saw 20 attached thereto is fixed to rails 21, 22 as described above and at a desired position relative to either fence 43 or 44. The chosen fence is then fixed at a perpendicular angle relative to rails 21, 22 and secured there by tightening the appropriate turn-bolt 45 or 46. Then, a workpiece 16 can be aligned with this fence and fed (i.e. moved) into the teeth of saw 21 which again is manually operated.

Mitered cuts can also be made with either or both the slidable or immovable saw configurations. The only difference in operation between the mitered and straight cuts is that a fence 43, 44 is positioned at the desired miter angle. Thus, with workpiece 16 positioned against the desired, secured fence, the slidable saw 20 can be moved over and through the workpiece; or the workpiece fed into and through a fixed, immovable saw 20. An example of the former is shown in FIGS. 1 and 6 while the latter, fixed saw formation is shown in FIG. 7.

Beveled cuts, another form of angled woodworking can be formed using power tool tilting mechanism 86. Beveling can be done with any of the above-described saw/workpiece orientations, i.e. with a slidable or fixed power tool, and/or a miter-angled fence or straight with or without a fence.

Figure 11:
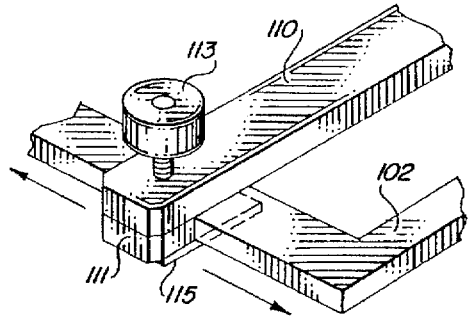
FIG. 11 is a fragmented, isometric view of a portion of the extension member of FIG. 10 also showing an optional fence member in operative association therewith.
Figure 10:
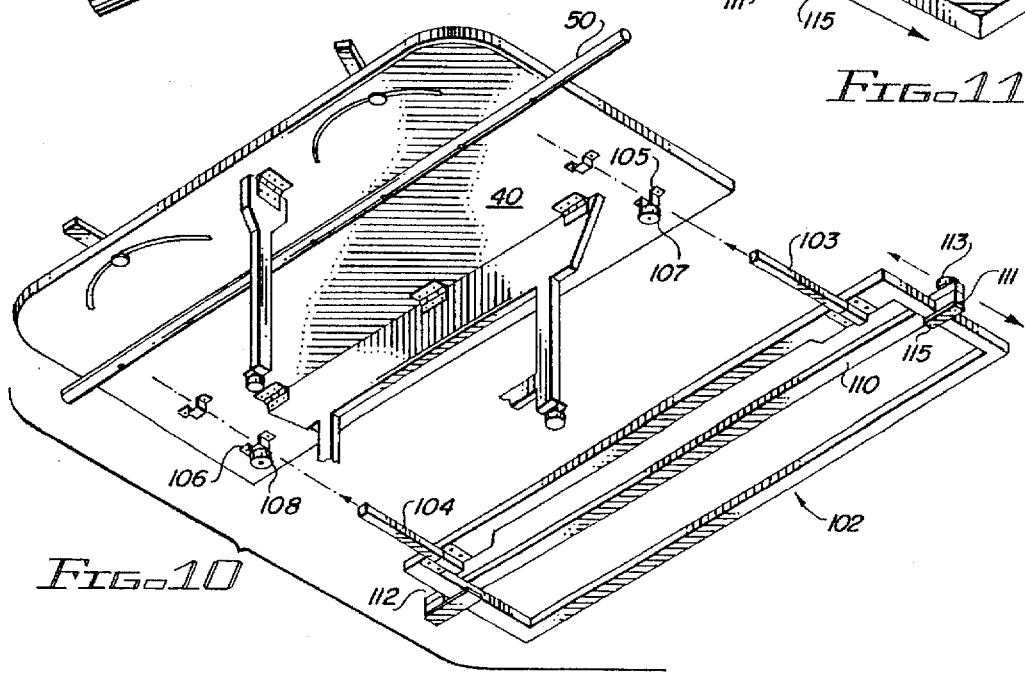
FIG. 10 is a partially fragmented, isometric bottom view of a workboard sub-assembly of the present invention including an optional extension member.

FIGS. 10 and 11 show an optional attachment device. An extension member 102 can be added to workboard sub-assembly 14 as shown. In particular, posts 103, 104 which are preferably bolted to extension member 102 can be inserted into corresponding post receivers 105, 106 which are fastened to the underside of body member 40. Upon complete insertion, turn-bolts 107, 108 are screwed into post receivers 105, 106 to secure posts 103, 104 in place. A plurality of post receivers may be attached to the under surface of body member 40 to further enhance the security of this attachment. Note, in the embodiment shown, extension 102 is a substantially hollow rectangle. This is but one form extension 102 can take for it can be solid, slightly hollowed, or otherwise.

FIGS. 10 and 11 also show another optional structural attachment which is a fence attachment herein designated as 110. Fence 110 is, as shown, oriented parallel to guide rails 21, 21 and as such is useful to hold workpieces 16 in such a position. Fence 110 can be used in either stationary saw or sliding saw mode and could conceivably also be used as a push member for pushing a workpiece 16 into the teeth of a stationary saw 20. The position of fence 110 may be controllably adjusted and/or fixed with the use of end blocks 111, 112 and turn-bolt locking mechanisms 113, 114. Thus, for example, a turn-bolt 113 would be disposed through an end of fence 110, through an end block 111 and into a clasp member 115 which is a substantially flatplate extending from block 111 to and engaging the underside of extension 102. Thus, when tightened, turn-bolts 113, 114 hold fence 110 in place.

Yet another optional attachment is illustrated in FIGS. 3, 4 and 12. Wheel sub-assembly 120 generally comprises an L-shaped bar 121, preferably made of a structural angle bar miter-jointed to form the shape shown best in FIG. 4 with long and short portions 122 and 123 respectively. To bar 121, a wheel support structure 124 including a wheel 125 is attached. Wheel structure 124 may be a caster but is preferably fixed so that wheel 125 does not uncontrollably swivel around. In use, long portion 122 of wheel sub-assembly 120 is inserted into post receiver 105, for example, and the respective turn-bolt 107 is tightened to secure wheel sub-assembly 120 therein. Then, workboard sub-assembly 14 may be easily moved from one site to another as shown in FIG. 12. One or more other wheel sub-assemblies could also be added such that, for example, a second one 126 (shown in FIG. 3) could simultaneously be disposed in post receiver 106 if desired. Note, a pivoting clasp member 128 is also shown in FIG. 12. Clasp member 128 is pivotably attached to support bar 50, and after legs 57 and 58 are folded up against the underside of body member 40, it is pivoted around and engages lateral leg support member 129 to hold legs 57 and 58 in place.

From the foregoing, it is readily apparent that a new and useful embodiment of the present invention has been herein described and illustrated which fulfills all of the aforestated objects in a remarkably unexpected fashion. It is of course understood that such modification, alterations and adaptations as may readily occur to the artisan confronted with this disclosure are intended within the spirit of this disclosure which is limited only by the scope of the claims appended hereto.

Accordingly, what is claimed is:

1. A portable woodworking assembly comprising: a frame sub-assembly having a first and a second longitudinal rail member disposed in spaced, parallel, coplanar relationship to each other, and support means operatively associated with said first and said second longitudinal rail members to support said first and second longitudinal rail members in stable position relative to the ground; a workboard sub-assembly operatively associated with said frame sub-assembly and including means for supporting a wooden workpiece thereon, said workboard sub-assembly further having a support bar attached to the underside thereof and said frame sub-assembly further having at least one U-shaped attachment member which operatively engages said support bar of said workboard sub-assembly; and a tool support structure adapted to support a portable power tool disposed thereon while simultaneously engaging each of said first and second longitudinal rail members of said frame sub-assembly, said tool support structure having a plurality of contact members which engage said first and second longitudinal rail members to thereby allow said tool support structure to be traversable along said longitudinal rail members and thus movable relative to a wooden workpiece stationarily disposed on said workboard sub-assembly to enable said stationary workpiece to be cut, shaped or formed in response to the action of said portable power tool, said tool support structure further having a plurality of extensions attached thereto and one or more clamp members detachably attached thereto, said plurality of extensions being engageable by said one or more clamp members to provide for the alternative of securely and immovably attaching said tool support structure to said longitudinal rail members so that a movable wooden workpiece can be moved to and thereby engage said portable power tool when it is stationarily disposed on said tool support structure.

2. A portable woodworking assembly according to claim 1 in which said workboard sub-assembly comprises a substantially rectangular body member adapted to be disposed underneath said longitudinal rail members of said frame sub-assembly, said body member having a partially circular slot defined in said body member to define a fence guide; said workboard sub-assembly also having a pivotable fence which has a pivot dowel fixed therein at one end thereof and a guide bolt disposed therethrough at the other end thereof, said pivotable fence being detachably pivotably and operably disposed on said body member by coaction of said pivot dowel of said fence with said body member and said fence having said guide bolt disposed in and through said fence guide and being coactively operable therewith to provide for fixing said pivotable fence in any of a plurality of angles relative to said longitudinal rail members of said frame sub-assembly.

3. A portable woodworking assembly according to claim 2 in which said guide bolt is part of a turn-bolt locking mechanism which is operable to secure said fence in any of a plurality of preselected positions.

4. A portable woodworking assembly according to claim 1 in which said tool support structure further has a first and a second cross member disposed in spaced, generally parallel relationship to each other; a first and a second side bar, each being disposed in orthogonal connecting relationship to said cross members, said cross members having means for securing a portable power tool thereto.

5. A portable woodworking assembly according to claim, 4 in which said means for securing a portable power tool to said tool support structure includes a semicircular slot for supporting said power tool, said semicircular slot allowing for selectively adjusting said power tool to be disposed at an angle relative to said cross members to define a bevel cut angle relative thereto.

6. A portable woodworking assembly according to claim 1 in which said frame sub-assembly comprises a plurality of turn-bolt locking mechanisms so that said frame sub-assembly may be simply disassemblable.

7. A portable woodworking assembly according to claim 1 in which said workboard sub-assembly has hinged leg members attached to the underside thereof to support said workboard sub-assembly in stable, operable position.

8. A portable woodworking assembly according to claim 1 in which said workboard sub-assembly further comprises a post receiver attached to the underside thereof and an extension member having at least one post which is operatively insertable in said post receiver to secure said extension member to said workboard sub-assembly.

9. A portable woodworking assembly according to claim 8 in which said workboard sub-assembly further comprises a detachable fence operatively attachable to said extension member.

10. A portable woodworking assembly according to claim 1 which further comprises a wheel sub-assembly which is attachable to said workboard sub-assembly to facilitate portability thereof.

11. A portable woodworking assembly comprising a disassemblable frame sub-assembly having a first and a second longitudinal rail member disposed in spaced, parallel, coplanar relationship to each other and support means operatively associated with said first and second longitudinal rail members to support said first and second longitudinal rail members in stable position relative to the ground, said support means also having at least one U-shaped attachment member attached thereto; a workboard sub-assembly operatively associated with said frame sub-assembly, said workboard sub-assembly having a support bar attached thereto, said support bar being-operatively engageable with said U-shaped attachment member to fix said workboard sub-assembly in stable position relative to said frame sub-assembly, and said workboard sub-assembly further having means for supporting a workpiece thereon; and a tool support structure to which a power tool may be attached, said tool support structure being operable to coact with said longitudinal rail members to position said power tool in operative relationship to said workpiece.

12. A portable woodworking assembly according to claim 11 in which said workboard sub-assembly comprises a substantially rectangular body member adapted to be disposed underneath said longitudinal rail members of said frame sub-assembly, said body member having a partially-circular slot defined in said body member to define a fence guide; said workboard sub-assembly also having a pivotable fence which has a pivot dowel fixed therein at one end thereof and a guide bolt disposed therethrough at the other end thereof, said pivotable fence being detachably, pivotably and operably disposed on said body member by coaction of said pivot dowel of said fence with said body member and said fence having said guide bolt disposed in and through said fence guide and being coactively operable therewith to provide for fixing said pivotable fence in any of a plurality of angles relative to said longitudinal rail members of said frame sub-assembly.

13. A portable woodworking assembly according to claim 12 in which said guide bolt is part of a turn-bolt locking mechanism which is operable to secure said fence in any of a plurality of preselected positions.

14. A portable woodworking assembly according to claim 11 in which said tool support structure further has a first and a second cross member disposed in spaced, generally parallel relationship to each other; a first and a second side bar, each being disposed in orthogonal connecting relationship to said cross members, said cross members having means for securing a portable power tool thereto; and said means for securing a portable power tool to said tool support structure includes a semicircular slot for supporting said power tool, said semicircular slot allowing for selectively adjusting said power tool to be disposed at an angle relative to said cross members to define a bevel cut angle relative thereto.

15. A portable woodworking assembly according to claim 11 in which said frame sub-assembly comprises a plurality of turn-bolt locking mechanisms so that said frame sub-assembly may be simply disassemblable.

16. A portable woodworking assembly according to claim 11 in which said workboard sub-assembly has hinged leg members attached to the underside thereof to support said workboard sub-assembly in stable, operable position.

17. A portable woodworking assembly according to claim 11 in which said workboard sub-assembly further comprises a post receiver attached to the underside thereof and an extension member having at least one post which is operatively insertable in said post receiver to secure said extension member to said workboard sub-assembly.

18. A portable woodworking assembly according to claim 17 in which said workboard sub-assembly further comprises a detachable fence operatively attachable to said extension member.

19. A portable woodworking assembly according to claim 11 which further comprises a wheel sub-assembly which is attachable to said workboard sub-assembly to facilitate portability thereof.

* * * * *